United States Patent
Fischer

(10) Patent No.: US 12,441,515 B2
(45) Date of Patent: Oct. 14, 2025

(54) METHOD AND APPARATUS FOR COATING CONTAINERS

(71) Applicant: KRONES AG, Neutraubling (DE)

(72) Inventor: Sven Fischer, Regensburg (DE)

(73) Assignee: KRONES AG, Neutraubling (DE)

( * ) Notice: Subject to any disclaimer, the term of this patent is extended or adjusted under 35 U.S.C. 154(b) by 153 days.

(21) Appl. No.: 16/822,628

(22) Filed: Mar. 18, 2020

(65) Prior Publication Data

US 2020/0307859 A1    Oct. 1, 2020

(30) Foreign Application Priority Data

Mar. 26, 2019    (DE) ..................... 10 2019 107 660.9

(51) Int. Cl.
| | |
|---|---|
| *B65D 23/02* | (2006.01) |
| *B65D 1/02* | (2006.01) |
| *B65D 23/08* | (2006.01) |
| *B65D 25/14* | (2006.01) |
| *B65D 25/34* | (2006.01) |
| *C23C 16/04* | (2006.01) |

(Continued)

(52) U.S. Cl.
CPC ........... *B65D 23/02* (2013.01); *B65D 1/0207* (2013.01); *B65D 23/0814* (2013.01); *B65D 25/14* (2013.01); *B65D 25/34* (2013.01); *C23C 16/045* (2013.01); *C23C 16/22* (2013.01); *C23C 16/401* (2013.01); *C23C 16/402* (2013.01); *C23C 16/448* (2013.01); *C23C 16/4481* (2013.01); *C23C 16/453* (2013.01); *C23C 16/50* (2013.01); *C23C 16/511* (2013.01); *B05D 1/08* (2013.01); *D21H 19/08* (2013.01)

(58) Field of Classification Search
None
See application file for complete search history.

(56) References Cited

U.S. PATENT DOCUMENTS

| | | | |
|---|---|---|---|
| 5,641,559 A | * | 6/1997 | Namiki ................... C23C 16/30 428/480 |
| 5,763,100 A | | 6/1998 | Quick et al. |

(Continued)

FOREIGN PATENT DOCUMENTS

| | | |
|---|---|---|
| DE | 101 38 697 A1 | 2/2003 |
| DE | 20 2012 013 166 U1 | 3/2015 |

(Continued)

OTHER PUBLICATIONS

ECOPAK Green Fibre Bottle, Slangerup, Denmark, 28.07.2017. URL: https://mediaopenideorwd.oiengine.com/attachments/12b b2989-922c-4832-a563-2553b50841ec.pdf [abgerufen am Feb. 11, 2019].

*Primary Examiner* — Mandy C Louie

(74) *Attorney, Agent, or Firm* — Schmeiser, Olsen & Watts, LLP

(57) ABSTRACT

Provided is a method for coating containers, and in particular beverage containers which are suitable and intended to receive a liquid, wherein the container to be coated has a main body, a shoulder region, a base region and a mouth region, wherein for coating of an inner wall and/or an outer wall of the container a silicon-containing coating material is produced from a flowable precursor, which is applied to the inner wall and/or the outer wall of the container. The container to be coated is a container made from a fiber-based material.

11 Claims, 1 Drawing Sheet

(51) Int. Cl.
*C23C 16/22* (2006.01)
*C23C 16/40* (2006.01)
*C23C 16/448* (2006.01)
*C23C 16/453* (2006.01)
*C23C 16/50* (2006.01)
*C23C 16/511* (2006.01)
*B05D 1/08* (2006.01)
*D21H 19/08* (2006.01)

(56) References Cited

U.S. PATENT DOCUMENTS

| | | | |
|---|---|---|---|
| 2001/0042510 A1* | 11/2001 | Plester | C23C 16/045 |
| | | | 118/723 E |
| 2008/0090039 A1 | 4/2008 | Klein et al. | |
| 2008/0268252 A1 | 10/2008 | Garces et al. | |
| 2009/0280268 A1* | 11/2009 | Glukhoy | C23C 16/458 |
| | | | 427/569 |
| 2010/0084361 A1* | 4/2010 | Dayton | B65D 15/08 |
| | | | 493/93 |
| 2013/0020277 A1* | 1/2013 | Berk | B65D 65/466 |
| | | | 215/379 |
| 2015/0217331 A1 | 8/2015 | Stoehr et al. | |
| 2017/0151765 A1 | 6/2017 | Öhman | |

FOREIGN PATENT DOCUMENTS

| | | |
|---|---|---|
| DE | 10 2016 114 292 A1 | 2/2018 |
| EP | 3409463 A1 | 12/2018 |
| WO | 96/33098 A2 | 10/1996 |
| WO | 99/17334 A1 | 4/1999 |
| WO | 2018/200783 A1 | 11/2018 |

* cited by examiner

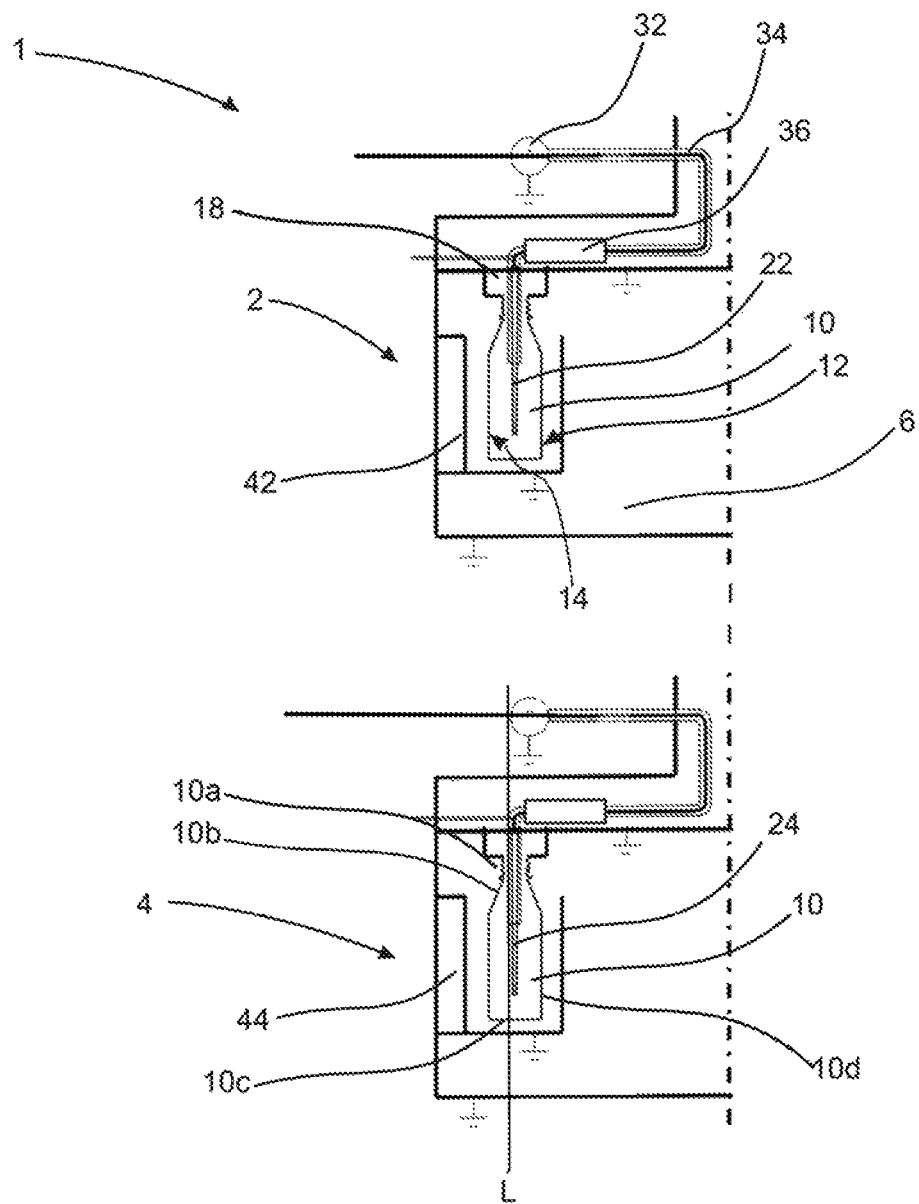

METHOD AND APPARATUS FOR COATING CONTAINERS

CROSS-REFERENCE TO RELATED APPLICATION

This application claims priority to German Application No. 10 2019 107 660.9, having a filing date of Mar. 26, 2019, the entire contents of which are hereby incorporated by reference.

FIELD OF TECHNOLOGY

The following relates to a method and an apparatus for coating an inner wall and/or an outer wall of containers and to a container for receiving a liquid. Such methods and apparatuses for coating containers have been known for a long time from the conventional art. In this case above all the inner walls and the outer walls of beverage bottles made from plastic or glass are coated in order to improve the barrier against escape and ingress of gases, light or the like and also to improve the moisture resistance of these containers. In this way in particular a diffusion of liquid or gas from the interior of the container to the exterior can also be prevented.

BACKGROUND

In particular in the milk and juice sector there has been a transition to filling carton packages. An advantage of these carton packages, in contrast to the conventional transparent plastic or glass packages, is the good barrier properties against light, oxygen, other gases and flavorings. However, a disadvantage of these carton packages is the lack of free mouldability for differentiation and accordingly the recognition value on the basis of an original or unique container shape.

Therefore, for a relatively long time possibilities have been sought for developing fiber-based containers which can be freely moulded for liquid food products. In this case in particular the avoidance of plastic materials is becoming increasingly important due to microplastics and plastics in oceans, in the food chain or food industry. The carton producers are therefore looking for alternatives to the common plastics and for possibilities for obtaining freely mouldable fiber-based containers, so-called pulp bottles, without the use of plastics, to be liquid-tight, gas-tight, flavour-tight and moisture-tight from the interior and from the exterior. For example, the product is oxidized by the penetration of oxygen from the exterior into the bottle. Thus, the shelf life of the beverage is reduced.

From the conventional art of the applicant, therefore, some time ago the containers were coated with wax, but this has considerable disadvantages. Currently, therefore, for example LDPE liquid is sprayed onto the containers to be coated or is applied as a powder and fused. However, the disadvantage in this case is that this in turn involves a plastic layer with the corresponding disadvantages in the perception, in the event of recycling, etc.

SUMMARY

An aspect relates to a coating process as well as an apparatus for a fiber-based container which make it possible to provide a liquid-tight, gas-tight, flavour-tight and moisture-tight container.

Therefore embodiments of the invention are directed to a method for coating containers, and in particular beverage containers which are suitable and intended to receive a liquid, wherein the container to be coated has a main body, a shoulder region, a base region and a mouth region, wherein for coating of an inner wall and/or an outer wall of the container a silicon-containing coating material is produced from a flowable precursor, which is applied to the inner wall and/or the outer wall of the container.

According to embodiments of the invention the container to be coated is a container made from a fiber-based material. The flowable precursor is a silicon-containing gas.

In this case it is also possible, that in addition to the fibers other different components are also present in the material, such as for example also plastic materials or plastic fibers.

Accordingly, due to the coating with a silicon-containing coating material, the container produced by embodiments of the invention can be used for liquids and, because of the avoidance of plastics for coating and for production of the container itself, is particularly environmentally friendly. Such a container ideally breaks down completely into its constituents after a relatively long retention period for example in the sea. Accordingly, a layer which is almost impermeable for liquids and gases and, moreover, dispenses completely with plastic constituents is applied to the walls of the container.

In a preferred method the container is arranged in a coating chamber during the coating. In this case this coating chamber is delimited relative to the environment by means of a plurality of walls and in particular by means of two side walls, a top wall and a base wall.

In this case a transport device is provided which transports the containers after production to the coating chamber. The containers are coated inside the coating chamber during the transport.

Advantageously the coating material has no plastic materials or plastic constituents. Accordingly, the coating material used is completely plastic-free and can be disposed of or recycled together with the fiber-based container. Due to this low-plastic coating it is accordingly not necessary to separate the inner constituents of the container from the outer wall and to dispose of the container separately, as is the case for example in known fiber-based containers. In these known containers for example a plastic preform has been expanded inside a fiber-based container or a barrier bag made from plastic inserted into the fiber-based container, in order to ensure the sealing integrity of this container. However, these have to be disposed of and recycled separately from the fiber-based container.

In a preferred method the fiber-based material is selected from a group of materials which includes pulp material (papier mâché), cellulose, paper pulp or the like.

The silicon-containing coating material is particularly advantageously SiOx. Due to the coating with SiOx a thin glass or glass-like layer in the nm range is formed on the inner wall and/or the outer wall of the container. In this case the "x" in the SiOx compound may have the value 2, 3 or 4, so that the compound $SiO_2$, $SiO_3$ or $SiO_4$ is formed.

In a particularly preferred method, for coating of the inner wall of the container the flowable precursor is vaporized and together with a gaseous medium and in particular with an oxygen-containing gas is introduced into the interior of the container. As mentioned above, the flowable precursor is a silicon-containing gas.

In this case for coating of the inner wall energy is supplied in the form of electromagnetic radiation, such as microwaves, high frequency or low frequency. Particularly this radiation is introduced into the above-mentioned coating chamber. Then the radiation passes through the wall of the container into the interior of the container and in combination with the gas introduced into the container (silicon-containing gas+oxygen) produces a plasma inside the container. Through this supply of energy and the production of the plasma, the gas molecules of the silicon-containing gas are broken down or split into their constituents so that the actual coating material SiOx is formed which is then deposited on the inner wall of the container. In this case this chemical vapour deposition or plasma polymerisation is advantageous in particular for coating of temperature-sensitive materials, since there is a low temperature load.

Alternatively, however, it would also be possible that in addition to the gas an electrode is introduced into the container, to which voltage pulses are applied, from which in turn the plasma is formed and due to the breakdown or the splitting of the gas molecules of the introduced gas the SiOx is deposited on the inner wall of the container.

Furthermore, $CO_2$ and $H_2O$ are formed during the formation of the SiOx, and are extracted as process "off-gases". In this case a possible reaction equation for the above process is for example:

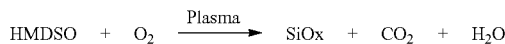

$$HMDSO \ + \ O_2 \ \xrightarrow{Plasma} \ SiOx \ + \ CO_2 \ + \ H_2O$$

In this case the HMDSO is the flowable precursor or the silicon-containing gas, which is supplied together with oxygen to the container. The compound SiOx which is produced is the coating material and the $CO_2$ and the $H_2O$ are the above-mentioned "off-gases". In this case in this reaction the HMDSO is used for example for the silicon-containing gas. Other flowable media would also be conceivable in this case. Accordingly, in a preferred embodiment the flowable precursor is selected from a group of precursors which includes HMDSO, HMDSN, TEOS or other Si-containing compounds and the like.

In both described coating methods, a vacuum is generated inside the container. For this purpose, the mouth region of the container is applied to a sealing means so as to form a seal. This sealing means or seal or sealant is likewise located inside the coating chamber. The method described above is a plasma coating method (PECVD=plasma-enhanced chemical vapour deposition).

The gas inlet and the microwave supply can advantageously take place via a common feed conduit which is introduced into the container.

In a further preferred method, the flowable precursor is applied with thermal action to the outer wall of the container for coating of the outer wall of the container.

In this case the flowable precursor or the silicon-containing gas is converted to SiOx inside or outside a spray torch and is flung by means of a gas stream in the form of spray particles onto the outer surface or outer wall of the container. Alternatively, the container can also be heated and the flowable precursor can be introduced into the coating chamber. Due to the heated container a thermal activation of the precursor takes place and leads to the formation of SiOx, which in turn is deposited on the container wall.

Accordingly, with embodiments of the present invention a coating method or a plant for plasma coating of PET and/or glass bottles is transferred to fiber-based containers or so-called pulp bottles. In this case the barrier is improved by the internal coating with SiOx in a vacuum. In order to prepare glass bottles for printing with ink, an SiOx layer is usually applied with a flame in order to increase the surface energy of the surface and to improve the printing. In this case this procedure is used for an outer coating for improvement of the moisture resistance and is likewise used with embodiments of the present invention for the coating of pulp bottles.

In a preferred method the coating of the inner wall and the outer wall of the container is carried out simultaneously at least at times. In this case, however, it would also be conceivable that the coating of the inner wall and the outer wall of the container is carried out successively and directly one after the other.

In a further preferred method at least the main body, the shoulder region and the base region of the container are produced from a fiber-based material. In this case at least the mouth region of the container is advantageously produced from a plastic material, such as PET, PP, PS, PE or the like. In this case the mouth region is understood to be the opening, the screw thread and the carrying ring of the container. In this case the mouth region of the container produced from the plastic material can be recycled separately from the main body, the shoulder region and the base region of the container. Accordingly, the container to be coated advantageously has a very low plastic content by comparison with conventional PET bottles or also with already known carton packages for beverages.

Furthermore, the container advantageously has a closure, wherein the closure is produced from a plastic material such as PET, PP, PS, PE or the like or a metal, such as aluminium or the like. Accordingly, the closure of the container can be recycled separately from the main body, the shoulder region and the base region of the container.

Furthermore, embodiments of the present invention is also directed to an apparatus for coating of containers, and in particular containers for beverages, which are suitable and intended to receive a liquid, wherein the container to be coated has a main body, a shoulder region, a base region and a mouth region, and the apparatus has a plurality of coating stations, wherein the containers can be transported by means of a transport device to the coating stations, wherein inside the coating station a silicon-containing coating material can be applied to the inner wall and/or the outer wall of the container.

In this case according to embodiments of the invention the container to be coated is a container made from a fiber-based material.

Advantageously the coating station is a closed space, wherein this closed space forms the above-mentioned coating chamber. The plurality of coating stations are arranged on a movable and in particular rotatable carrier.

In this case the apparatus for coating the containers is connected upstream of an apparatus for producing the containers and upstream of an apparatus for producing the fiber-based containers. In this case the containers are transported by the transport device from the apparatus for producing the containers to the apparatus for coating the containers. In this case the coating of the containers is carried out during the transport of the containers through the system. For this purpose, the coating stations move with the containers. However, it would also be conceivable that the coating stations are stationary coating stations and accordingly the containers are not moved during the coating and in particular are not moved through the apparatus.

In this case the transport device advantageously has a plurality of holding devices. These holding devices are grippers, which grip the containers at the mouth region thereof and accordingly at the "plastic parts" thereof. However, it would also be conceivable that the holding devices are mandrels which are introduced into the mouths of the containers.

The apparatus for coating the containers is a plasma coating plant.

In a further advantageous embodiment, the apparatus has a feed conduit which is suitable and intended for feeding a flowable and in particular gaseous medium to the container and in particular for introducing a flowable medium into the container. In particular in this case this is a gaseous medium which ultimately serves for coating the inner walls of the container and is advantageously the above-mentioned precursor and a further gas, such as oxygen.

Furthermore, the apparatus advantageously has a second feed conduit which is suitable and intended for feeding a flowable and in particular gaseous medium to the coating chamber or the coating station. In this case this is a gaseous medium which serves for coating the outer walls of the container and accordingly is advantageously the above-mentioned precursor and a further gas, such as oxygen.

Furthermore, embodiments of the present invention is also directed to a container for receiving a liquid, such as in particular a beverage, wherein the container has successively along its longitudinal direction a mouth region, a shoulder region, a main body and a base region, wherein at least the main body and the base region of the container are produced from a fiber-based material.

According to embodiments of the invention, the container has a coating made from a silicon-containing coating material on an inner wall and/or an outer wall. The container according to embodiments of the invention is accordingly coated with a plastic-free coating material.

Accordingly, the main body and the base region of the container can be recycled separately from the shoulder region and the mouth region. In this case the shoulder region and the mouth region are produced from known plastic materials, such as PET, PP, PS, PE or like, such as the beverage bottles already known from the conventional art.

In this case the container is designed in such a way that it is suitable and intended to receive liquids, such as in particular milk, juice, carbonated and non-carbonated soft drinks, beer, water, wine, sparkling wine, spirits, liquid food and the like. Furthermore, the container is suitable and intended to be coated by the coating method described above or to be processed by the apparatus described above.

In this case a successive arrangement of the mouth region, the shoulder region, the main body and the base region is understood to mean that with the container in an upright position, i.e. with the mouth region upwards, the container has from top to bottom the mouth region, the shoulder region, the main body and the base region. In this case an upright position of the container is understood to mean that the mouth region is further away from the centre of the earth than the base region.

In a further preferred embodiment, the fiber-based material is selected from a group of materials which includes pulp material (papier mâché), cellulose, paper pulp or the like.

In this case at least the main body, the shoulder region and the base region of the container are produced from a fiber-based material. Accordingly, in this embodiment of the container the main body and the base region of the container can be recycled separately from the mouth region. Accordingly, in this embodiment of the container only the mouth region is produced from a plastic material, such as PET, PP, PS, PE or the like. However, advantageously it would be conceivable also to produce the entire container, that is to say the mouth region, the shoulder region, the main body and the base region of the container, from a fiber-based material.

Accordingly, the container according to embodiments of the invention is a container which has the fewest possible plastic constituents and completely dispenses with plastic constituents.

BRIEF DESCRIPTION

Some of the embodiments will be described in detail, with reference to the following FIGURES, wherein like designations denote like members, wherein:

FIG. 1 shows a detail of an apparatus for coating containers.

DETAILED DESCRIPTION

FIG. 1 shows a detail of an apparatus 1 according to embodiments of the invention for coating containers 10. In this case in this illustration the apparatus 1 has a first coating station 2 and a second coating station 4, wherein a plurality of such coating stations are provided.

The coating stations 2, 4 shown in this embodiment each have a first electrode 22 or 24, which can be introduced into a container 10 to be coated. As already mentioned above, however, a coating method is also conceivable in which the energy is supplied by means of electromagnetic radiation, such as microwave radiation, high frequency or low frequency. Furthermore, a driving device (not shown) is also provided, which effects a movement of the first electrode 22 or 24 into the container and/or a movement of the container 10 to the electrode 22. In this case the electrode 22 or 24 is introduced into a mouth or a mouth region 10a of the container. The first electrode 22 or 24 is designed as a rod-like body and in particular as a body having a cross-section which is smaller than the mouth cross-section of the container 10. In this case the first electrode 22 of the first coating station 2 and the first electrode 24 of the second coating station 4 are operated independently of one another.

In addition, the coating stations 2, 4 each have a second electrode 42, 44, which is arranged outside the container 10. This second electrode 42 or 44 is a counter electrode, which is earthed here. In this case the first electrodes 22 or 24 and the second electrodes 42 or 44 are part of a coating method for coating an inner wall 14 of the container.

The reference 32 designates a media reservoir, for instance a reservoir for the flowable precursor or the silicon-containing gas. The reference 34 designates a feed conduit in order to feed the flowable medium from the media reservoir 32 to the containers 10, and the reference 36 designates a control device which controls the feeding of the medium into the containers 10. In particular in this case the time or the amount of the flowable medium is controlled.

In this case as shown in FIG. 1 the container 10 has successively in the longitudinal direction L a mouth region 10, a shoulder region 10b, a base region 10c and a main body 10d. The reference 12 further designates the outer wall of the container.

The reference 18 furthermore designates a sealing means. In this case the container 10 is pressed against this sealing means or seal or sealant 18, so that a vacuum can be generated inside the container 10.

The applicant reserves the right to claim all the features disclosed in the application documents as essential to embodiments of the invention in so far as they are individually or in combination novel over the conventional art.

Furthermore, it is pointed out that in the individual drawings features were also described which may be advantageous per se. The person skilled in the art recognises immediately that a specific feature described in a drawing may also be advantageous without the incorporation of further features from this drawing. Furthermore, the person skilled in the art recognises that advantages may also result from a combination of several features shown in individual drawings or in different drawings.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 apparatus
2 first coating station
4 second coating station
6 coating chamber
10 container
10a mouth region
10b shoulder region
10c base region
10d main body
12 outer wall of the container 10
14 inner wall of the container 10
18 sealing means or seal or sealant
22, 24 first electrode
32 media reservoir
34 feed conduit
36 control device
42, 44 second electrode

The invention claimed is:

1. A method for coating a beverage container which is suitable and intended to receive a liquid, wherein the beverage container to be coated has a main body, a shoulder region, a base region, and a mouth region, wherein a coating material is applied to at least one of an inner wall and an outer wall of the beverage container, wherein at least the mouth region, the shoulder region, the main body, and the base region are produced from a fiber-based material, wherein the beverage container is transported by a transport device from an apparatus for producing the beverage container to an apparatus for coating the beverage container, wherein the apparatus for coating the beverage container has a plurality of coating stations, wherein the beverage container is coated inside a coating chamber during transport, and wherein each coating station is a closed space and the plurality of coating stations are arranged on a rotatable carrier, such that the coating stations move with the containers.

2. The method according to claim 1, wherein the coating material is a silicon-containing coating material.

3. The method according to claim 1, wherein for coating of the inner wall of the beverage container the flowable precursor is vaporized and together with a gaseous medium having an oxygen-containing gas introduced into the interior of the beverage container.

4. The method according to claim 1, wherein the flowable precursor is applied to the outer surface or outer wall of the beverage container for coating of the outer surface or outer wall of the beverage container, wherein the flowable precursor is converted to SiOx inside or outside a spray torch and is flung by means of a gas stream in the form of spray particles onto the outer surface or outer wall of the beverage container or the beverage container is heated and the flowable precursor is introduced into a coating chamber, wherein due to the heated beverage container a thermal activation of the flowable precursor takes place and leads to the formation of SiOx, which in turn is deposited on the outer surface or outer wall of the beverage container.

5. The method according to claim 1, wherein the flowable precursor is selected from a group of precursors which includes HMDSO, HMDSN, TEOS or other Si-containing compounds.

6. The method according to claim 1, wherein the coating of the inner wall and of the outer wall of the beverage container is carried out simultaneously at least at times.

7. The method according to claim 1, wherein the beverage container has a closure, wherein the closure is produced from a plastic material selected from the group consisting of PET, PP, PS, and PE or a metal.

8. The method according to claim 7, wherein the beverage container has a closure, wherein the closure is produced from aluminium.

9. The method according to claim 1, wherein the apparatus has a first feed conduit configured for feeding a flowable medium to the inner walls of the container.

10. The method according to claim 1, wherein the apparatus has second feed conduit configured for feeding a flowable medium to the outer walls of the container.

11. The method according to claim 1, wherein the flowable medium comprises a precursor and a further gas.

* * * * *